United States Patent
Miyazawa

(10) Patent No.: US 10,086,588 B2
(45) Date of Patent: *Oct. 2, 2018

(54) RESIN MATERIAL AND RESIN FILM

(71) Applicant: ZEON CORPORATION, Tokyo (JP)

(72) Inventor: Shinsuke Miyazawa, Tokyo (JP)

(73) Assignee: ZEON CORPORATION, Tokyo (JP)

(*) Notice: Subject to any disclaimer, the term of this patent is extended or adjusted under 35 U.S.C. 154(b) by 56 days.

This patent is subject to a terminal disclaimer.

(21) Appl. No.: 15/103,585

(22) PCT Filed: Dec. 19, 2014

(86) PCT No.: PCT/JP2014/083738
§ 371 (c)(1),
(2) Date: Jun. 10, 2016

(87) PCT Pub. No.: WO2015/093601
PCT Pub. Date: Jun. 25, 2015

(65) Prior Publication Data
US 2016/0303830 A1  Oct. 20, 2016

(30) Foreign Application Priority Data

Dec. 20, 2013 (JP) ................. 2013-263231

(51) Int. Cl.
| | | |
|---|---|---|
| *B32B 15/08* | (2006.01) | |
| *C08F 277/00* | (2006.01) | |
| *C08G 61/08* | (2006.01) | |
| *C08L 65/00* | (2006.01) | |
| *C08J 5/18* | (2006.01) | |
| *B32B 27/20* | (2006.01) | |
| *C09J 165/00* | (2006.01) | |

(52) U.S. Cl.
CPC .............. *B32B 15/08* (2013.01); *B32B 27/20* (2013.01); *C08F 277/00* (2013.01); *C08G 61/08* (2013.01); *C08J 5/18* (2013.01); *C08L 65/00* (2013.01); *C09J 165/00* (2013.01); *B32B 2307/704* (2013.01); *B32B 2439/70* (2013.01); *B32B 2439/80* (2013.01); *C08G 2261/135* (2013.01); *C08G 2261/3325* (2013.01); *C08G 2261/418* (2013.01); *C08G 2261/724* (2013.01); *C08G 2261/76* (2013.01); *C08J 2345/00* (2013.01); *C08J 2365/00* (2013.01); *C08J 2445/00* (2013.01); *C08J 2465/00* (2013.01); *C08L 2205/02* (2013.01)

(58) Field of Classification Search
CPC .................................................. C08F 277/00
See application file for complete search history.

(56) References Cited

U.S. PATENT DOCUMENTS

| | | | |
|---|---|---|---|
| 5,783,639 A | 7/1998 | Kataoka et al. | |
| H001807 H * | 10/1999 | Anderson, II | ............. 427/443.1 |
| 9,631,083 B2 * | 4/2017 | Miyazawa | ............... C08K 7/14 |
| 2002/0103303 A1 | 8/2002 | Kodemura | |
| 2005/0014898 A1 * | 1/2005 | Kanai | ................. C08L 23/0823 |
| | | | 525/163 |

FOREIGN PATENT DOCUMENTS

| | | | |
|---|---|---|---|
| EP | 2 957 596 A1 | 12/2015 | |
| JP | H05-345817 A | 12/1993 | |
| JP | H08-20692 A | 1/1996 | |
| JP | H11-269394 A | 10/1999 | |
| JP | H11-292991 A | 10/1999 | |
| JP | 2002-194067 A | 7/2002 | |
| JP | 2002-363370 A | 12/2002 | |
| JP | 2006-052333 A | 2/2006 | |
| WO | WO-8503511 A1 * | 8/1985 | ............ C08F 255/00 |
| WO | 1998/018838 A1 | 5/1998 | |
| WO | 02/098974 A1 | 12/2002 | |
| WO | 2014/125921 A1 | 8/2014 | |

OTHER PUBLICATIONS

Mar. 31, 2015 International Search Report issued in International Patent Application No. PCT/JP2014/083738.
Mar. 31, 2015 Written Opinion issued in International Patent Application No. PCT/JP2014/083738.
Jul. 14, 2017 Extended European Search Report issued in European Patent Application No. 14872800.9.

* cited by examiner

*Primary Examiner* — Ramsey E Zacharia
(74) *Attorney, Agent, or Firm* — Oliff PLC

(57) ABSTRACT

A resin material including a hydrogenated crystalline polar group-containing dicyclopentadiene ring-opening polymer and a hydrogenated crystalline non-polar dicyclopentadiene ring-opening polymer in a weight ratio (hydrogenated crystalline polar group-containing dicyclopentadiene ring-opening polymer:hydrogenated crystalline non-polar dicyclopentadiene ring-opening polymer) of 100:0 to 1:99, the hydrogenated crystalline polar group-containing dicyclopentadiene ring-opening polymer being obtained by melt-mixing a hydrogenated crystalline non-polar dicyclopentadiene ring-opening polymer, a radical initiator, and a polar group-containing compound that includes an ethylenically unsaturated bond, the resin material including a structural unit derived from the polar group-containing compound that includes an ethylenically unsaturated bond in a ratio of 0.05 to 3.0 parts by weight based on 100 parts by weight of the hydrogenated crystalline polar group-containing dicyclopentadiene ring-opening polymer and the hydrogenated crystalline non-polar dicyclopentadiene ring-opening polymer in total; and a resin film including the resin material; and a laminate film including the resin film.

7 Claims, No Drawings

RESIN MATERIAL AND RESIN FILM

TECHNICAL FIELD

The present invention relates to a resin material that exhibits excellent adhesion to a metal, and is suitable as a material for forming a transparent resin film that includes a metal wire, and also relates to a resin film.

BACKGROUND ART

A hydrogenated norbornene-based ring-opening copolymer exhibits excellent optical properties, weatherability, electrical properties, and the like, and is used in a wide variety of fields (e.g., optical material). Since the hydrogenated norbornene-based ring-opening copolymer exhibits excellent humidity resistance, transparency, heat resistance, chemical resistance, and the like, the hydrogenated norbornene-based ring-opening copolymer is also suitably used in the field of a packaging film used for food, a drug, and the like.

It is known that a hydrogenated product of an amorphous polar group-containing norbornene-based ring-opening polymer obtained using a norbornene-based monomer that includes a polar group exhibits excellent adhesion to a metal.

However, the hydrogenated product of the amorphous polar group-containing norbornene-based ring-opening polymer exhibits inferior humidity resistance and the like due to the polar group.

In order to solve this problem, Patent Literature 1 proposes a graft modification technique using a solution method or a melt method that hydrogenates a non-polar norbornene-based ring-opening polymer produced using a norbornene-based monomer that does not include a polar group to obtain a hydrogenated product, and reacts the hydrogenated product with a polar group-containing compound that includes an ethylenically unsaturated bond (e.g., maleic anhydride) in the presence of a radical initiator. According to the method disclosed in Patent Literature 1, it is possible to reduce the amount of polar group introduced into the polymer. In the example of Patent Literature 1, graft modification is effected in cyclohexane to obtain a modified product, and the modified product is coagulated using acetone, separated, and dried to obtain a hydrogenated product of an amorphous polar group-containing norbornene-based ring-opening polymer, which is dissolved in a solvent together with a cross-linking agent to obtain a cross-linkable resin composition.

CITATION LIST

Patent Literature

Patent Literature 1: JP-A-08-020692

SUMMARY OF INVENTION

Technical Problem

An object of the invention is to provide a resin material that can produce a film that exhibits excellent adhesion to a metal thin film, a resin film that exhibits excellent adhesion to a metal thin film, and a laminate film that includes a resin film that exhibits excellent adhesion to a metal thin film.

Solution to Problem

Several aspects of the invention provide the following resin material (see (1) and (2)), resin film (see (3)), and laminate film (see (4)).

(1) A resin material including a hydrogenated crystalline polar group-containing dicyclopentadiene ring-opening polymer and a hydrogenated crystalline non-polar dicyclopentadiene ring-opening polymer in a weight ratio (hydrogenated crystalline polar group-containing dicyclopentadiene ring-opening polymer:hydrogenated crystalline non-polar dicyclopentadiene ring-opening polymer) of 100:0 to 1:99, the hydrogenated crystalline polar group-containing dicyclopentadiene ring-opening polymer being obtained by melt-mixing a hydrogenated crystalline non-polar dicyclopentadiene ring-opening polymer, a radical initiator, and a polar group-containing compound that includes an ethylenically unsaturated bond, the resin material including a structural unit derived from the polar group-containing compound that includes an ethylenically unsaturated bond in a ratio of 0.05 to 3.0 parts by weight based on 100 parts by weight of the hydrogenated crystalline polar group-containing dicyclopentadiene ring-opening polymer and the hydrogenated crystalline non-polar dicyclopentadiene ring-opening polymer in total.

(2) The resin material according to (1), wherein the polar group included in the polar group-containing compound that includes an ethylenically unsaturated bond is an alkoxysilyl group or a carboxylic acid residue.

(3) A resin film including the resin material according to (1) or (2).

(4) A laminate film including the resin film according to (3), and a metal thin film that is stacked on the resin film.

Advantageous Effects of Invention

The aspects of the invention thus provide a resin material that can produce a film that exhibits excellent adhesion to a metal thin film, a resin film that exhibits excellent adhesion to a metal thin film, and a laminate film that includes a resin film that exhibits excellent adhesion to a metal thin film.

DESCRIPTION OF EMBODIMENTS

Exemplary embodiments of the invention are described in detail below.

1) Resin Material

A resin material according to one embodiment of the invention includes a hydrogenated crystalline polar group-containing dicyclopentadiene ring-opening polymer and a hydrogenated crystalline non-polar dicyclopentadiene ring-opening polymer in a weight ratio (hydrogenated crystalline polar group-containing dicyclopentadiene ring-opening polymer:hydrogenated crystalline non-polar dicyclopentadiene ring-opening polymer) of 100:0 to 1:99, the hydrogenated crystalline polar group-containing dicyclopentadiene ring-opening polymer being obtained by melt-mixing a hydrogenated crystalline non-polar dicyclopentadiene ring-opening polymer, a radical initiator, and a polar group-containing compound that includes an ethylenically unsaturated bond, the resin material including a structural unit derived from the polar group-containing compound that includes an ethylenically unsaturated bond in a ratio of 0.05 to 3.0 parts by weight based on 100 parts by weight of the hydrogenated crystalline polar group-containing dicyclopentadiene ring-opening polymer and the hydrogenated crystalline non-polar dicyclopentadiene ring-opening polymer in total.

1. Hydrogenated Crystalline Non-Polar Dicyclopentadiene Ring-Opening Polymer

The hydrogenated crystalline non-polar dicyclopentadiene ring-opening polymer used in connection with one embodiment of the invention is a polymer that is obtained by subjecting dicyclopentadiene to ring-opening polymerization to obtain a dicyclopentadiene ring-opening polymer, hydrogenating the dicyclopentadiene ring-opening polymer to obtain a hydrogenated dicyclopentadiene ring-opening polymer, and forming the hydrogenated dicyclopentadiene ring-opening polymer by extrusion or the like.

The hydrogenated dicyclopentadiene ring-opening polymer is crystalline, and has a melting point. Various additives may optionally be added when hydrogenating the dicyclopentadiene ring-opening polymer.

The hydrogenated dicyclopentadiene ring-opening polymer may be produced using an arbitrary method. For example, the hydrogenated dicyclopentadiene ring-opening polymer may be produced using the method disclosed in JP-A-2006-52333. The method disclosed in JP-A-2006-52333 produces a dicyclopentadiene ring-opening polymer having syndiotacticity, and hydrogenates the dicyclopentadiene ring-opening polymer to efficiently produce the target hydrogenated dicyclopentadiene ring-opening polymer.

Dicyclopentadiene is classified into an endo-stereoisomer and an exo-stereoisomer. Both the endo-stereoisomer and the exo-stereoisomer can be used as a monomer. Either the endo-stereoisomer or the exo-stereoisomer may be used alone, or an isomer mixture that includes the endo-stereoisomer and the exo-stereoisomer in an arbitrary ratio may be used. Note that it is preferable to increase the ratio of the endo-stereoisomer or the exo-stereoisomer from the viewpoint of improving the crystallinity and the heat resistance of the hydrogenated dicyclopentadiene ring-opening polymer. For example, it is preferable to set the ratio of the endo-stereoisomer or the exo-stereoisomer to 80% or more, more preferably 90% or more, and particularly preferably 95% or more. Note that it is preferable to increase the ratio of the endo-stereoisomer from the viewpoint of ease of synthesis.

The dicyclopentadiene ring-opening polymer may be produced by copolymerizing a monomer (other than dicyclopentadiene) that does not include a polar group with dicyclopentadiene as long as a crystalline dicyclopentadiene ring-opening polymer can be obtained.

Examples of the monomer that does not include a polar group include a polycyclic norbornene-based monomer other than dicyclopentadiene, a bicyclic norbornene-based compound that does not include a cyclic structure that is fused with the norbornene skeleton, a monocycloolefin, a cyclic diene, and derivatives thereof.

A hydrogenated dicyclopentadiene ring-opening polymer that has syndiotacticity is obtained by hydrogenating a dicyclopentadiene ring-opening polymer that has syndiotacticity.

Therefore, it is necessary to use a ring-opening polymerization catalyst that can provide the resulting dicyclopentadiene ring-opening polymer with syndiotacticity when subjecting dicyclopentadiene to ring-opening polymerization. A ring-opening polymerization catalyst that includes a metal compound represented by the following formula (3) (hereinafter may be referred to as "metal compound (3)") is preferable as the ring-opening polymerization catalyst.

$$M(NR^8)X_{4-a}(OR^9)_a \cdot Lb \quad (3)$$

wherein M is a metal atom selected from the transition metal atoms that belong to Group 6 in the periodic table, $R^8$ is a phenyl group that is unsubstituted or substituted at at least one of the positions 3, 4, and 5, or a group represented by $CH_2R^{10}$, $R^9$ is a group selected from a substituted or unsubstituted alkyl group and a substituted or unsubstituted aryl group, X is an atom or a group selected from a halogen atom, an alkyl group, an aryl group, and an alkylsilyl group, L is a neutral electron donor ligand, a is 0 or 1, b is an integer from 0 to 2, and $R^{10}$ is a hydrogen atom, or a group selected from a substituted or unsubstituted alkyl group and a substituted or unsubstituted aryl group.

Note that the expression "substituted or unsubstituted" used herein in connection with a group or the like means that the group or the like is unsubstituted, or substituted with a substituent (hereinafter the same).

The metal atom (M) included in the metal compound (3) is selected from the transition metal atoms (chromium, molybdenum, and tungsten) that belong to Group 6 in the periodic table. Among these, molybdenum and tungsten are preferable, and tungsten is particularly preferable.

The metal compound (3) includes a metal-imide bond. $R^8$ is a substituent that is bonded to the nitrogen atom that forms the metal-imide bond.

Examples of a substituent that may substitute the phenyl group that is unsubstituted or substituted at at least one of the positions 3, 4, and 5, include an alkyl group such as a methyl group and an ethyl group; a halogen atom such as a fluorine atom, a chlorine atom, and a bromine atom; an alkoxy group such as a methoxy group, an ethoxy group, and an isopropoxy group; and the like. Note that substituents that substitute the phenyl group at at least two of the positions 3, 4, and 5 may be bonded to each other.

Specific examples of the phenyl group that is unsubstituted or substituted at at least one of the positions 3, 4, and 5, include a phenyl group; a monosubstituted phenyl group such as a 4-methylphenyl group, a 4-chlorophenyl group, a 3-methoxyphenyl group, a 4-cyclohexylphenyl group, and a 4-methoxyphenyl group; a disubstituted phenyl group such as a 3,5-dimethylphenyl group, a 3,5-dichlorophenyl group, a 3,4-dimethylphenyl group, and a 3,5-dimethoxyphenyl group; a trisubstituted phenyl group such as a 3,4,5-trimethylphenyl group and a 3,4,5-trichlorophenyl group; and a substituted or unsubstituted 2-naphthyl group such as a 2-naphthyl group, a 3-methyl-2-naphthyl group, and a 4-methyl-2-naphthyl group.

The number of carbon atoms of the substituted or unsubstituted alkyl group that may be represented by $R^{10}$ (that is included in the group represented by $CH_2R^{10}$ (that may be used as the substituent ($R^8$ in the formula (3)) that is bonded to the nitrogen atom included in the metal compound (3))) is not particularly limited. The number of carbon atoms of the substituted or unsubstituted alkyl group is normally 1 to 20, preferably 1 to 10, and more preferably 1 to 4. The alkyl group may be either linear or branched. Examples of a substituent that may substitute the alkyl group include, but are not limited to, a substituted or unsubstituted phenyl group such as a phenyl group and a 4-methylphenyl group; and an alkoxy group such as a methoxy group and an ethoxy group.

Examples of the substituted or unsubstituted aryl group that may be represented by $R^{10}$ include a phenyl group, a 1-naphthyl group, a 2-naphthyl group, and the like. Examples of a substituent that may substitute the aryl group include, but are not limited to, a substituted or unsubstituted phenyl group such as a phenyl group and a 4-methylphenyl group; an alkoxy group such as a methoxy group and an ethoxy group; and the like.

$R^{10}$ is preferably an alkyl group having 1 to 20 carbon atoms, such as a methyl group, an ethyl group, a propyl group, an isopropyl group, a butyl group, an isobutyl group, a t-butyl group, a pentyl group, a hexyl group, an octyl group, or a decyl group.

The metal compound (3) includes three or four atoms or groups selected from a halogen atom, an alkyl group, an aryl group, and an alkylsilyl group. Specifically, X in the formula (3) is an atom or a group selected from a halogen atom, an alkyl group, an aryl group, and an alkylsilyl group. Note that the metal compound (3) may have a structure in which two or more groups represented by X are bonded to each other.

Examples of the halogen atom that may be represented by X include a chlorine atom, a bromine atom, and an iodine atom. Examples of the alkyl group include a methyl group, an ethyl group, a propyl group, an isopropyl group, a butyl group, an isobutyl group, a t-butyl group, a pentyl group, a neopentyl group, a benzyl group, a neophyl group, and the like. Examples of the aryl group include a phenyl group, a 4-methylphenyl group, a 2,6-dimethylphenyl group, a 1-naphthyl group, a 2-naphthyl group, and the like. Examples of the alkylsilyl group include a trimethylsilyl group, a triethylsilyl group, a t-butyldimethylsilyl group, and the like.

The metal compound (3) may include one metal-alkoxide bond or one metal-aryloxide bond. The substituent ($R^9$ in the formula (3)) that is bonded to the oxygen atom that forms the metal-alkoxide bond or the metal-aryloxide bond is a group selected from a substituted or unsubstituted alkyl group and a substituted or unsubstituted aryl group. Examples of the substituted or unsubstituted alkyl group and the substituted or unsubstituted aryl group that may be represented by $R^9$ include those mentioned above in connection with $R^{10}$.

The metal compound (3) may include one or two neutral electron donor ligands. Examples of the neutral electron donor ligand (L in the formula (3)) include an electron donor compound that includes an element (atom) among the elements that belong to Group 14 or 15 in the periodic table. Specific examples of the neutral electron donor ligand include phosphines such as trimethylphosphine, triisopropylphosphine, tricyclohexylphosphine, and triphenylphosphine; ethers such as diethyl ether, dibutyl ether, 1,2-dimethoxyethane, and tetrahydrofuran; amines such as trimethylamine, triethylamine, pyridine, and lutidine; and the like. Among these, an ether is particularly preferable.

Examples of the metal compound (3) that may particularly preferably be used as the ring-opening polymerization catalyst for producing a dicyclopentadiene ring-opening polymer that has syndiotacticity, include a tungsten compound that includes a phenylimide group (i.e., the compound represented by the formula (3) wherein M is a tungsten atom, and $R^8$ is a phenyl group). It is particularly preferable to use tetrachlorotungsten phenylimide-(tetrahydrofuran).

The metal compound (3) may be synthesized by mixing an oxyhalogenated product of a Group 6 transition metal, phenyl isocyanates that is unsubstituted or substituted at at least one of the positions 3, 4, and 5 (or monosubstituted methyl isocyanates), and a neutral electron donor ligand (L) optionally together with alcohols, a metal alkoxide, or a metal aryloxide (e.g., the method disclosed in JP-A-5-345817), for example. The metal compound (3) thus synthesized may be purified and isolated through crystallization or the like, or the resulting solution may be used directly as the ring-opening polymerization catalyst without purification.

The metal compound (3) (ring-opening polymerization catalyst) is used in such an amount that the molar ratio (metal compound (3):monomer(s) in total) of the metal compound (3) to the monomer(s) in total is normally 1:100 to 1:2,000,000, preferably 1:500 to 1:1,000,000, and more preferably 1:1,000 to 1:500,000. If the amount of the catalyst is too large, it may be difficult to remove the catalyst. If the amount of the catalyst is too small, sufficient polymerization activity may not be obtained.

The metal compound (3) may be used alone as the ring-opening polymerization catalyst. Note that it is preferable to use an organometallic reducing agent in combination with the metal compound (3) from the viewpoint of improving the polymerization activity.

Examples of the organometallic reducing agent include a compound that includes an element among the elements that belong to Group 1, 2, 12, 13, or 14 in the periodic table, and a hydrocarbon group having 1 to 20 carbon atoms. An organolithium, an organomagnesium, an organozinc, an organoaluminum, and an organotin are preferable, and an organoaluminum and an organotin are particularly preferable.

Examples of the organolithium include n-butyllithium, methyllithium, phenyllithium, and the like. Examples of the organomagnesium include butylethylmagnesium, butyloctylmagnesium, dihexylmagnesium, ethylmagnesium chloride, n-butylmagnesium chloride, allylmagnesium bromide, and the like. Examples of the organozinc include dimethylzinc, diethylzinc, diphenylzinc, and the like. Examples of the organoaluminum include trimethylaluminum, triethylaluminum, triisobutylaluminum, diethylaluminum chloride, ethylaluminum sesquichloride, ethylaluminum dichloride, diethylaluminum ethoxide, diisobutylaluminum isobutoxide, ethylaluminum diethoxide, isobutylaluminum diisobutoxide, and the like. Examples of the organotin include tetramethyltin, tetra(n-butyl)tin, tetraphenyltin, and the like.

The organometallic reducing agent is preferably used in a 0.1 to 100-fold amount, more preferably a 0.2 to 50-fold amount, and particularly preferably a 0.5 to 20-fold amount (on a molar basis), based on the amount of the metal compound (3). If the amount of the organometallic reducing agent is too small, the polymerization activity may not be improved. If the amount of the organometallic reducing agent is too large, a side reaction may easily occur.

The polymerization reaction for producing the crystalline dicyclopentadiene ring-opening polymer is normally effected in an organic solvent. The organic solvent is not particularly limited as long as the organic solvent can dissolve or disperse the target ring-opening polymer (or a hydrogenated product thereof) under specific conditions, and does not hinder the polymerization reaction and the hydrogenation reaction.

Specific examples of the organic solvent include an aliphatic hydrocarbon such as pentane, hexane, and heptane; an alicyclic hydrocarbon such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; an aromatic hydrocarbon such as benzene, toluene, and xylene; a halogen-containing aliphatic hydrocarbon such as dichloromethane, chloroform, and 1,2-dichloroethane; a halogen-containing aromatic hydrocarbon such as chlorobenzene and dichlorobenzene; a nitrogen-containing hydrocarbon-based solvent such as nitromethane, nitrobenzene, and acetonitrile; ethers such as diethyl ether and tetrahydrofuran; and a mixed solvent thereof. Among these, an aromatic hydrocarbon, an aliphatic hydrocarbon, an alicyclic hydrocarbon, and ethers are preferably used.

The ring-opening polymerization reaction can be initiated by mixing the monomer and the metal compound (3) optionally together with the organometallic reducing agent. These components may be added in an arbitrary order. For example, a mixture including the metal compound (3) and the organometallic reducing agent may be added to the monomer, and the resulting mixture may be mixed, or a mixture including the monomer and the metal compound (3) may be added to the organometallic reducing agent, and the resulting mixture may be mixed, or the metal compound (3) may be added to a mixture including the monomer and the organometallic reducing agent, and the resulting mixture may be mixed.

Each component may be added at one time, or may be added stepwise. Each component may be added continuously over a relatively long time (e.g., 1 minute or more). It is preferable to add the monomer or the metal compound (3) either stepwise or continuously from the viewpoint of controlling the polymerization temperature and the molecular weight of the resulting ring-opening polymer, and obtaining a resin composition that exhibits excellent formability. It is particularly preferable to add the monomer either stepwise or continuously.

The monomer concentration in the organic solvent when effecting the polymerization reaction is not particularly limited, but is preferably 1 to 50 wt %, more preferably 2 to 45 wt %, and particularly preferably 3 to 40 wt %. If the monomer concentration is too low, the productivity of the polymer may deteriorate. If the monomer concentration is too high, the viscosity of the polymer solution may increase to a large extent, and it may be difficult to effect the subsequent hydrogenation reaction.

An activity modifier may be added to the polymerization system. The activity modifier may be used to stabilize the ring-opening polymerization catalyst, and adjust the rate of the polymerization reaction and the molecular weight distribution of the polymer. The activity modifier is not particularly limited as long as the activity modifier is an organic compound that includes a functional group. It is preferable to use an oxygen-containing organic compound, a nitrogen-containing organic compound, or a phosphorus-containing organic compound as the activity modifier. Specific examples of the activity modifier include ethers such as diethyl ether, diisopropyl ether, dibutyl ether, anisole, furan, and tetrahydrofuran; ketones such as acetone, benzophenone, and cyclohexanone; esters such as ethyl acetate; nitriles such as acetonitrile and benzonitrile; amines such as triethylamine, triisopropylamine, quinuclidine, and N,N-diethylaniline; pyridines such as pyridine, 2,4-lutidine, 2,6-lutidine, and 2-t-butylpyridine; phosphines such as triphenylphosphine and tricyclohexylphosphine; phosphates such as trimethyl phosphate and triphenyl phosphate; phosphine oxides such as triphenylphosphine oxide; and the like. These activity modifiers may be used either alone or in combination. The activity modifier may be added in an arbitrary amount. The activity modifier is normally added in a ratio of 0.01 to 100 mol % based on the metal compound that is used as the ring-opening polymerization catalyst.

A molecular weight modifier may be added to the polymerization system in order to adjust the molecular weight of the ring-opening polymer. Examples of the molecular weight modifier include an α-olefin such as 1-butene, 1-pentene, 1-hexene, and 1-octene; an aromatic vinyl compound such as styrene and vinyltoluene; an oxygen-containing vinyl compound such as ethyl vinyl ether, isobutyl vinyl ether, allyl glycidyl ether, allyl acetate, allyl alcohol, and glycidyl methacrylate; a halogen-containing vinyl compound such as arylchloride; a nitrogen-containing vinyl compound such as acrylamide; a non-conjugated diene such as 1,4-pentadiene, 1,4-hexadiene, 1,5-hexadiene, 1,6-heptadiene, 2-methyl-1,4-pentadiene, and 2,5-dimethyl-1,5-hexadiene; and a conjugated diene such as 1,3-butadiene, 2-methyl-1,3-butadiene, 2,3-dimethyl-1,3-butadiene, 1,3-pentadiene, and 1,3-hexadiene.

The molecular weight modifier may be added in an arbitrary amount taking account of the desired molecular weight. The molecular weight modifier is normally added in a ratio of 0.1 to 50 mol % based on the monomer.

The polymerization temperature is not particularly limited, but is normally −78 to +200° C., and preferably −30 to +180° C. The polymerization time is not particularly limited, and is determined taking account of the reaction scale. The polymerization time is normally 1 minute to 1000 hours.

A dicyclopentadiene ring-opening polymer having syndiotacticity can be obtained by subjecting the monomer including dicyclopentadiene to ring-opening polymerization under the above conditions using the ring-opening polymerization catalyst that includes the metal compound (3).

The ratio of racemo diads in the dicyclopentadiene ring-opening polymer (that is subjected to the hydrogenation reaction) is not particularly limited, but is normally 60% or more, preferably 65% or more, and more preferably 70 to 99%. The ratio of racemo diads (i.e., the degree of syndiotacticity) in the dicyclopentadiene ring-opening polymer can be adjusted by appropriately selecting the type of the ring-opening polymerization catalyst, for example.

The weight average molecular weight (polystyrene-equivalent weight average molecular weight) (Mw) of the dicyclopentadiene ring-opening polymer (that is subjected to the hydrogenation reaction) determined by gel permeation chromatography is not particularly limited, but is preferably 10,000 to 100,000, and more preferably 15,000 to 80,000. A hydrogenated dicyclopentadiene ring-opening polymer that is produced using the dicyclopentadiene ring-opening polymer that has a weight average molecular weight within the above range exhibits excellent formability, and can produce a formed article that exhibits excellent heat resistance. The weight average molecular weight of the dicyclopentadiene ring-opening polymer can be adjusted by adjusting the amount of the molecular weight modifier used during polymerization, for example.

The molecular weight distribution (i.e., the ratio (Mw/Mn) of the polystyrene-equivalent weight average molecular weight to the polystyrene-equivalent number average molecular weight determined by gel permeation chromatography) of the dicyclopentadiene ring-opening polymer (that is subjected to the hydrogenation reaction) is not particularly limited, but is normally 1.5 to 4.0, and preferably 1.6 to 3.5. A hydrogenated dicyclopentadiene ring-opening polymer that is produced using the dicyclopentadiene ring-opening polymer that has a molecular weight distribution within the above range exhibits excellent formability. The molecular weight distribution of the hydrogenated dicyclopentadiene ring-opening polymer can be adjusted by appropriately selecting the monomer addition method, or adjusting the monomer concentration when effecting the ring-opening polymerization reaction.

The dicyclopentadiene ring-opening polymer (i.e., the main-chain double bond of the dicyclopentadiene ring-opening polymer) may be hydrogenated by supplying hydrogen to the reaction system in the presence of a hydrogenation catalyst. The hydrogenation catalyst is not particularly limited as long as the hydrogenation catalyst is normally used when hydrogenating an olefin compound. Examples of the hydrogenation catalyst include the following catalysts.

Examples of a homogeneous catalyst include a catalyst system that includes a transition metal compound and an alkali metal compound, such as a catalyst system that includes cobalt acetate and triethylaluminum, a catalyst system that includes nickel acetylacetonate and triisobutylaluminum, a catalyst system that includes titanocene dichloride and n-butyllithium, a catalyst system that includes zirconocene dichloride and sec-butyllithium, and a catalyst system that includes tetrabutoxytitanate and dimethyl magnesium. Further examples of the homogeneous catalyst include a noble metal complex catalyst such as dichlorobis(triphenylphosphine)palladium, chlorohydridocarbonyltris(triphenylphosphine)ruthenium, bis(tricyclohexylphosphine)benzylidineruthenium(IV) dichloride, and chlorotris(triphenylphosphine)rhodium.

Examples of a heterogeneous catalyst include nickel, palladium, platinum, rhodium, ruthenium, and a solid catalyst in which a metal among these metals is supported on a carrier such as carbon, silica, diatomaceous earth, alumina, or titanium oxide (e.g., nickel/silica, nickel/diatomaceous earth, nickel/alumina, palladium/carbon, palladium/silica, palladium/diatomaceous earth, and palladium/alumina).

The hydrogenation reaction is normally effected in an inert organic solvent. Examples of the inert organic solvent include an aromatic hydrocarbon such as benzene and toluene; an aliphatic hydrocarbon such as pentane and hexane; an alicyclic hydrocarbon such as cyclohexane and decahydronaphthalene; ethers such as tetrahydrofuran and ethylene glycol dimethyl ether; and the like. The inert organic solvent may normally be the same as the solvent used for the polymerization reaction. Specifically, the hydrogenation catalyst may be added directly to the polymer solution, and the hydrogenation reaction may be effected.

The hydrogenation reaction may be effected under appropriate conditions taking account of the hydrogenation catalyst. The reaction temperature (hydrogenation temperature) is normally −20 to +250° C., preferably −10 to +220° C., and more preferably 0 to +200° C. If the hydrogenation temperature is too low, the rate of the reaction (i.e., the rate of the hydrogenation reaction) may be too low. If the hydrogenation temperature is too high, a side reaction may occur. The hydrogen pressure is normally 0.01 to 20 MPa, preferably 0.05 to 15 MPa, and more preferably 0.1 to 10 MPa. If the hydrogen pressure is too low, the rate of the hydrogenation reaction may be too low. If the hydrogen pressure is too high, it may be necessary to use a pressure reactor (i.e., the reaction equipment is limited). The reaction time (hydrogenation reaction time) is not particularly limited as long as the desired hydrogenation rate can be achieved. The reaction time is normally 0.1 to 10 hours.

The hydrogenation rate (i.e., the ratio of main-chain double bonds that have been hydrogenated) of the dicyclopentadiene ring-opening polymer is not particularly limited, but is preferably 70% or more, more preferably 80% or more, particularly preferably 90% or more, and most preferably 99% or more. The heat resistance of the hydrogenated dicyclopentadiene ring-opening polymer increases as the hydrogenation rate increases.

The hydrogenated dicyclopentadiene ring-opening polymer produced as described above maintains the syndiotacticity of the ring-opening polymer subjected to the hydrogenation reaction. Therefore, the resulting hydrogenated dicyclopentadiene ring-opening polymer has syndiotacticity. The ratio of racemo diads in the hydrogenated dicyclopentadiene ring-opening polymer used in connection with one embodiment of the invention is not particularly limited as long as the hydrogenated dicyclopentadiene ring-opening polymer has crystallinity, but is normally 60% or more, preferably 65% or more, and more preferably 70 to 99%.

Since the tacticity of a polymer does not change due to a hydrogenation reaction, a hydrogenated dicyclopentadiene ring-opening polymer that has syndiotacticity and crystallinity and includes a repeating unit derived from dicyclopentadiene can be obtained by hydrogenating a dicyclopentadiene ring-opening polymer that has syndiotacticity.

The ratio of racemo diads in the hydrogenated dicyclopentadiene ring-opening polymer can be quantitatively determined by analyzing the $^{13}$C-NMR spectrum (spectrum data) of the hydrogenated dicyclopentadiene ring-opening polymer. The ratio of racemo diads in the hydrogenated dicyclopentadiene ring-opening polymer can be determined by subjecting the hydrogenated dicyclopentadiene ring-opening polymer to $^{13}$C-NMR analysis at 200° C. using a 1,3,5-trichlorobenzene-d3/o-dichlorobenzene-d4 (mixing ratio: 2/1) mixed solvent as a solvent, and calculating the ratio of racemo diads from the intensity ratio of the signal at 43.35 ppm (that is attributed to meso diads) to the signal at 43.43 ppm (that is attributed to racemo diads).

The melting point of the hydrogenated dicyclopentadiene ring-opening polymer that is used in connection with one embodiment of the invention is not particularly limited as long as the hydrogenated dicyclopentadiene ring-opening polymer has crystallinity, but is preferably 260 to 275° C. A resin composition that exhibits formability and heat resistance in a well-balanced manner can be obtained by utilizing the hydrogenated dicyclopentadiene ring-opening polymer that has a melting point within the above range. The melting point of the hydrogenated dicyclopentadiene ring-opening polymer can be adjusted by adjusting the degree of syndiotacticity (i.e., the ratio of racemo diads) of the hydrogenated dicyclopentadiene ring-opening polymer, or appropriately selecting the type of monomer, for example.

2. Radical Initiator

The radical initiator used in connection with one embodiment of the invention is a compound that generates radicals due to heat. A peroxide is preferably used as the radical initiator.

A compound having a one-minute half-life temperature of 170 to 190° C. is preferably used as the peroxide. For example, t-butyl cumyl peroxide, dicumyl peroxide, di-t-hexyl peroxide, 2,5-dimethyl-2,5-di(t-butylperoxy)hexane, di-t-butyl peroxide, di-(2-t-butylperoxyisopropyl)benzene, 2,5-dimethyl-2,5-di(t-butylperoxy)hexyne-3, di(2-t-butylperoxyisopropyl)benzene, and the like are preferably used.

These peroxides may be used either alone or in combination. The peroxide is normally used in a ratio of 0.05 to 2 parts by weight, preferably 0.1 to 1 part by weight, and more preferably 0.2 to 0.5 parts by weight, based on 100 parts by weight of the hydrogenated crystalline non-polar dicyclopentadiene ring-opening polymer.

3. Polar Group-Containing Compound that Includes Ethylenically Unsaturated Bond

Examples of the polar group-containing compound that includes an ethylenically unsaturated bond that is used in connection with one embodiment of the invention include a silane coupling agent and an olefin-containing carboxylic acid derivative.

Examples of the silane coupling agent include an alkoxysilane compound in which the organic functional group includes a vinyl group, such as vinyltrimethoxysilane and vinyltriethoxysilane; an alkoxysilane compound in which the organic functional group includes an epoxy group, such as 2-(3,4-epoxycyclohexyl)ethyltrimethoxysilane, 2-glycidoxypropylmethyldimethoxysilane, 3-glycidoxypropyltrimethoxysilane, 3-glycidoxypropylmethyldiethoxysilane, and 3-glycidoxypropyltriethoxysilane; an alkoxysilane compound in which the organic functional group includes a styryl group, such as p-styryltrimethoxysilane; an alkoxysilane compound in which the organic functional group includes a (meth)acrylic group, such as 3-methacryloxypropylmethyldimethoxysilane, 3-methacryloxypropyltrimethoxysilane, 3-methacryloxypropylmethyldiethoxysilane, 3-methacryloxypropyltriethoxysilane, and 3-acryloxypropyltrimethoxysilane; an alkoxysilane compound in which the organic functional group includes an amino group, such as N-2-(aminoethyl)-3-aminopropylmethyldimethoxysilane, N-2-(aminoethyl)-3-aminopropyltrimethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, and N-(vinylbenzyl)-2-aminoethyl-3-aminopropyltrimethoxysilane hydrochloride; an alkoxysilane compound in which the organic functional group includes an isocyanurate group, such as tris(trimethoxysilylpropyl) isocyanurate; an alkoxysilane compound in which the organic functional group includes a ureido group, such as 3-ureidopropyltriethoxysilane; an alkoxysilane compound in which the organic functional group includes a mercapto group, such as 3-mercaptopropylmethyldimethoxysilane and 3-mercaptopropyltrimethoxysilane; an alkoxysilane compound in which the organic functional group includes a sulfide group, such as bis(triethoxysilylpropyl) tetrasulfide; an alkoxysilane compound in which the organic functional group includes an isocyanate group, such as 3-isocyanatepropyltriethoxysilane; and the like.

When the silane coupling agent is used, an alkoxysilyl group that includes an organic functional group is introduced into the hydrogenated crystalline non-polar dicyclopentadiene ring-opening polymer.

Examples of the olefin-containing carboxylic acid derivative include unsaturated carboxylic acids such as acrylic acid, methacrylic acid, maleic acid, fumaric acid, itaconic acid, citraconic acid, tetrahydrophthalic acid, methyltetrahydrophthalic acid, endo-cis-bicyclo[2,2,1]hept-5-ene-2,3-dicarboxylic acid, and methyl-endo-cis-bicyclo[2,2,1]hept-5-ene-2,3-dicarboxylic acid; acrylic esters such as methyl acrylate and ethyl acrylate; methacrylic esters such as methyl methacrylate and ethyl methacrylate; dicarboxylic diesters such as dimethyl maleate, dimethyl fumarate, diethyl itaconate, and dimethyl citraconate; cyclic unsaturated carboxylic esters such as 5-methoxycarbonyl-2-norbornene, 5-methyl-5-methoxycarbonyl-2-norbornene, dimethyl tetrahydrophthalate, diethyl methyltetrahydrophthalate, dimethyl endo-cis-bicyclo[2,2,1]hept-5-ene-2,3-dicarboxylate, and dimethyl methyl-endo-cis-bicyclo[2,2,1]hept-5-ene-2,3-dicarboxylate; unsaturated group-containing anhydrides such as maleic anhydride, itaconic anhydride, citraconic anhydride, tetrahydrophthalic anhydride, methyltetrahydrophthalic anhydride, endo-cis-bicyclo[2,2,1]hept-5-ene-2,3-dicarboxylic anhydride, and methyl-endo-cis-bicyclo[2,2,1]hept-5-ene-2,3-dicarboxylic anhydride; and the like.

When the olefin-containing carboxylic acid derivative is used, a carboxylic acid residue is introduced into the hydrogenated crystalline non-polar dicyclopentadiene ring-opening polymer.

These polar group-containing compounds that include an ethylenically unsaturated bond may be used either alone or in combination. The polar group-containing compound that includes an ethylenically unsaturated bond is normally used in a ratio of 0.1 to 10 parts by weight, preferably 0.2 to 5 parts by weight, and more preferably 0.3 to 3 parts by weight, based on 100 parts by weight of the hydrogenated crystalline non-polar dicyclopentadiene ring-opening polymer.

4. Hydrogenated Crystalline Polar Group-Containing Dicyclopentadiene Ring-Opening Polymer The hydrogenated crystalline polar group-containing dicyclopentadiene ring-opening polymer is obtained by melt-mixing the hydrogenated crystalline non-polar dicyclopentadiene ring-opening polymer, the radical initiator, and the polar group-containing compound that includes an ethylenically unsaturated bond. The components may be melt-mixed in the presence of an organic solvent from the viewpoint of operability. Note that it is preferable to melt-mix the components in the absence of a solvent in order to improve the surface flatness-smoothness of the resulting film.

A polar group can be introduced into the hydrogenated crystalline non-polar dicyclopentadiene ring-opening polymer by melt-mixing the above components.

The melt mixing method is not particularly limited. For example, the components are normally mixed at about 260 to 340° C. (preferably about 265 to 320° C., and more preferably about 270 to 300° C.) for about 0.1 to 10 minutes (preferably about 0.2 to 5 minutes, and more preferably about 0.3 to 2 minutes) using a multi-screw kneader such as a twin-screw kneader. The components may be continuously mixed and extruded so that the temperature and the residence time fall within the above ranges.

The polar group is normally introduced in a ratio of 0.05 to 3 parts by weight, preferably 0.2 to 3 parts by weight, and more preferably 0.3 to 3 parts by weight, based on 100 parts by weight of the hydrogenated crystalline polar group-containing dicyclopentadiene ring-opening polymer and the hydrogenated crystalline non-polar dicyclopentadiene ring-opening polymer in total. If the amount of polar group introduced is too large, deterioration in humidity resistance may occur. Moreover, when an alkoxysilyl group is introduced as the polar group, for example, the alkoxysilyl group may be decomposed due to water contained in the atmosphere, and a cross-linking reaction may occur. As a result, gelation may occur, or a decrease in formability may occur due to a decrease in melt-flowability, for example. If the amount of polar group introduced is too small, the resin material may exhibit insufficient adhesion to a metal thin film. The introduction of the polar group may be determined from the IR spectrum. The amount of polar group introduced may be calculated from the IR spectrum using a calibration curve provided in advance, or may be calculated from the $^1$H-NMR spectrum. Note that the integration count is increased when the amount of polar group introduced is small.

The molecular weight of the hydrogenated crystalline polar group-containing dicyclopentadiene ring-opening polymer obtained as described above is substantially identical to that of the non-polar dicyclopentadiene ring-opening polymer and the hydrogenated crystalline non-polar dicyclopentadiene ring-opening polymer that are used as the raw material, since the amount of polar group introduced is small.

5. Resin Material

The resin material according to one embodiment of the invention includes the hydrogenated crystalline polar group-containing dicyclopentadiene ring-opening polymer and the hydrogenated crystalline non-polar dicyclopentadiene ring-opening polymer.

The resin material according to one embodiment of the invention includes the hydrogenated crystalline polar group-containing dicyclopentadiene ring-opening polymer and the hydrogenated crystalline non-polar dicyclopentadiene ring-opening polymer in a weight ratio (hydrogenated crystalline polar group-containing dicyclopentadiene ring-opening polymer:hydrogenated crystalline non-polar dicyclopentadiene ring-opening polymer) of 100:0 to 1:99, preferably 100:0 to 97:3, and more preferably 100:0 to 95:5. When the resin material includes the hydrogenated crystalline polar group-containing dicyclopentadiene ring-opening polymer and the hydrogenated crystalline non-polar dicyclopentadiene ring-opening polymer in a weight ratio within the above range, the resin material exhibits excellent adhesion to a polar substance such as a metal.

Since the resin material includes a structural unit derived from the polar group-containing compound in a ratio as small as 0.05 to 3.0 parts by weight based on 100 parts by weight of the hydrogenated crystalline polar group-containing dicyclopentadiene ring-opening polymer and the hydrogenated crystalline non-polar dicyclopentadiene ring-opening polymer in total, the electrical properties of the hydrogenated crystalline non-polar dicyclopentadiene ring-opening polymer are not impaired.

An arbitrary additive may be added to the resin material according to one embodiment of the invention taking account of the intended use. Examples of the additive include an antioxidant such as a phenol-based antioxidant, a phosphorus-based antioxidant, and a sulfur-based antioxidant; a light stabilizer such as a hindered amine-based light stabilizer; a wax such as a petroleum-based wax, a Fischer-Tropsch wax, and a polyalkylene wax; a nucleator such as a sorbitol-based compound, a metal salt of an organophosphoric acid, a metal salt of an organic carboxylic acid, kaolin, and talc; a fluorescent whitening agent such as a diaminostilbene derivative, a coumarin derivative, an azole-based derivative (e.g., benzoxazole derivative, benzotriazole derivative, benzimidazole derivative, and benzothiazole derivative), a carbazole derivative, a pyridine derivative, a naphthalic acid derivative, and an imidazolone derivative; a UV absorber such as a benzophenone-based UV absorber, a salicylate-based UV absorber, and a benzotriazole-based UV absorber; an inorganic filler such as talc, silica, calcium carbonate, and glass fibers; a colorant; a flame retardant; a flame retardant promoter; an antistatic agent; a plasticizer; a near-infrared absorber; a lubricant; a filler; a polymer material other than the hydrogenated dicyclopentadiene ring-opening polymer, such as a soft polymer; and the like.

These additives may be added to a mixture including the hydrogenated crystalline non-polar dicyclopentadiene ring-opening polymer, the radical initiator, and the polar group-containing compound that includes an ethylenically unsaturated bond when melt-mixing the mixture, or may be added when mixing the hydrogenated crystalline polar group-containing dicyclopentadiene ring-opening polymer optionally together with the hydrogenated crystalline non-polar dicyclopentadiene ring-opening polymer to produce the resin material (as described later).

The resin material according to one embodiment of the invention may be obtained using (α) a method that mixes the hydrogenated crystalline polar group-containing dicyclopentadiene ring-opening polymer obtained by melt-mixing the hydrogenated crystalline non-polar dicyclopentadiene ring-opening polymer, the radical initiator, and the polar group-containing compound that includes an ethylenically unsaturated bond optionally together with an arbitrary additive, or (β) a method that mixes the hydrogenated crystalline polar group-containing dicyclopentadiene ring-opening polymer, the hydrogenated crystalline non-polar dicyclopentadiene ring-opening polymer, and an optional additive in a specific ratio.

When the resin material includes the hydrogenated crystalline non-polar dicyclopentadiene ring-opening polymer, the hydrogenated crystalline non-polar dicyclopentadiene ring-opening polymer described above (see "1. Hydrogenated crystalline non-polar dicyclopentadiene ring-opening polymer") may be used as the hydrogenated crystalline non-polar dicyclopentadiene ring-opening polymer without specific limitations. The hydrogenated crystalline non-polar dicyclopentadiene ring-opening polymer may be the same as or different from the hydrogenated crystalline non-polar dicyclopentadiene ring-opening polymer used to produce the hydrogenated crystalline polar group-containing dicyclopentadiene ring-opening polymer (in terms of molecular weight and molecular weight distribution).

2) Resin Film

A film according to one embodiment of the invention includes the resin material according to one embodiment of the invention.

The method for forming a film using the resin material according to one embodiment of the invention is not particularly limited. It is preferable to use a melt extrusion method since it is easy to control the thickness of the film, and the advantageous effects of the invention can be easily achieved.

When forming a film using a melt extrusion method, the cylinder temperature (molten resin temperature) is normally set to 250 to 330° C., and preferably 260 to 310° C., the cast roll temperature is normally set to 45 to 160° C., and preferably 45 to 130° C., and the cooling roll temperature is normally set to 25 to 150° C., and preferably 45 to 120° C. A film-shaped formed article (film) having a thickness of 1 μm to 1 mm can be easily obtained by extruding the resin composition according to one embodiment of the invention.

The resulting film may optionally be stretched. The film may be stretched using an arbitrary method. The film may be stretched using a known stretching method. For example, the film may be stretched using a uniaxial stretching method such as a method that uniaxially stretches the film in the machine direction by utilizing the difference in circumferential speed between rolls, or a method that uniaxially stretches the film in the transverse direction using a tenter-type stretching machine; a biaxial stretching method such as a simultaneous biaxial stretching method that stretches the film in the machine direction by increasing the interval between holding clips while stretching the film in the transverse direction by utilizing the spread angle of a guide rail, or a successive biaxial stretching method that stretches the film in the machine direction by utilizing the difference in circumferential speed between rolls, and stretches the film in the transverse direction using a tenter-type stretching machine while holding each end of the film using a clip; a method that continuously stretches the film diagonally at an arbitrary angle θ with respect to the widthwise direction of the film using a tenter-type stretching machine that can apply a feeding force, a tensile force, or a take-up force that differs in speed in the transverse direction or the machine direction; or the like.

The stretching temperature is normally set to 95 to 135° C., and preferably 100 to 130° C. The stretching ratio is normally set to 1.2 to 10, and preferably 1.5 to 5. When using a biaxial stretching method, the stretching ratio is defined by the product of the stretching ratio in the machine direction and the stretching ratio in the transverse direction.

It is possible to provide the stretched film with dimensional stability by heating the stretched film. The stretched film may be heated using an arbitrary method. For example, the stretched film may be heated by introducing hot air into a heat treatment oven, or may be heated by utilizing radiant heat (e.g., using an infrared heater).

The heating temperature is normally set to 150 to 220° C., and preferably 160 to 210° C. The heating time is normally set to 1 to 600 minutes, and preferably 3 to 300 minutes.

The thickness of the film according to the film according to one embodiment of the invention is normally 1 to 1,000 µm, preferably 5 to 800 µm, and more preferably 10 to 500 µm.

The resin material according to one embodiment of the invention is also suitably used as a material for forming an electronic part such as a connector, a relay, a condenser, a sensor, an antenna, an IC tray, a chassis, a coil sealing member, a motor case, and a power supply box; an LED optical reflector; a vehicular lamp reflector; an automotive part such as an automotive motor case, a sensor case, and a module part case; an optical lens barrel; a flexible printed circuit board; a printed circuit board release film; a solar cell substrate; a home appliance part for a microwave oven, a rice cooker, an electric thermo pot, a washer-drier, a dishwasher, and an air conditioner; a packaging/packing film; a food sheet/tray; an LED molding material; a housing part such as a pump casing, an impeller, a pipe joint, and a bathroom panel; and the like.

3) Laminate Film

A laminate film according to one embodiment of the invention includes the film according to one embodiment of the invention, and a metal thin film that is stacked on the film according to one embodiment of the invention.

The laminate film according to one embodiment of the invention may be obtained by stacking the metal thin film on the film according to one embodiment of the invention that is obtained as described above. Examples of the metal for forming the metal thin film include copper, aluminum, nickel, chromium, gold, silver, a combination thereof, and the like.

The metal thin film may be stacked using an arbitrary method. For example, the metal thin film may be stacked by electrolytic plating, may be stacked by placing the metal thin film and the resin film one on top of the other, and thermocompression-bonding the metal thin film and the resin film, or may be stacked by stacking the metal thin film using a roll press machine or the like.

The thickness of the metal thin film (metal thin film layer) stacked on the film is not particularly limited, and may be selected taking account of the intended use. The thickness of the metal thin film is normally 0.01 to 500 µm, preferably 0.05 to 300 µm, and more preferably 0.1 to 100 µm.

The laminate film according to one embodiment of the invention exhibits high initial peel strength, and does not show a significant change in peel strength even when allowed to stand at 150° C. for 200 hours (i.e., the resin film exhibits excellent adhesion to the metal thin film).

The laminate film according to one embodiment of the invention may suitably be used for a wide variety of applications in the food field, the medical treatment field, the electrical-electronic field, the optics field, the public welfare field, the civil engineering and construction field, and the like. The laminate film according to one embodiment of the invention is particularly suitable for applications in the food field, the medical treatment field, the electrical-electronic field, the optics field, and the like. More specifically, the laminate film according to one embodiment of the invention may be used as a food packaging material such as a wrapping film, a shrink film, and a food packing bag for cake, pickles, and the like; various parts for medical treatment applications such as an infusion bag, a drip bag, a press through package film, and a blister pack film; an electrical-electronic part such as a flexible printed circuit board film, a film capacitor, an infrared lens, a high-frequency circuit board film, an antenna substrate film, a battery separator film, and a release film; and an optical film such as a retardation film, a polarizing film, a diffuser sheet, a condenser sheet, an optical card, a touch panel substrate film, and a flexible display substrate film.

EXAMPLES

The invention is further described below by way of examples and comparative examples. Note that the invention is not limited to the following examples. The units "parts" and "%" used in connection with the examples and the comparative examples respectively refer to "parts by weight" and "wt %" unless otherwise indicated. The measurement methods and the evaluation methods used in connection with the examples and the comparative examples are described below.

(1) Molecular Weight (Weight Average Molecular Weight and Number Average Molecular Weight) of Dicyclopentadiene Ring-Opening Polymer The molecular weight (weight average molecular weight and number average molecular weight) of the dicyclopentadiene ring-opening polymer was determined as a polystyrene-equivalent value using a gel permeation chromatography (GPC) system "HLC-8220" (manufactured by Tosoh Corporation) and an H-type column (manufactured by Tosoh Corporation) (solvent: tetrahydrofuran, measurement temperature: 40° C.).

(2) Hydrogenation Rate of Hydrogenated Dicyclopentadiene Ring-Opening Polymer

The hydrogenation rate of the hydrogenated dicyclopentadiene ring-opening polymer was determined by $^1$H-NMR measurement.

(3) Melting Point of Hydrogenated Dicyclopentadiene Ring-Opening Polymer

The melting point of the hydrogenated dicyclopentadiene ring-opening polymer was measured using a differential scanning calorimeter at a heating rate of 10° C./min.

(4) Ratio of Racemo Diads in Hydrogenated Dicyclopentadiene Ring-Opening Polymer The ratio of racemo diads in the hydrogenated dicyclopentadiene ring-opening polymer was determined by subjecting the hydrogenated dicyclopentadiene ring-opening polymer to $^{13}$C-NMR analysis at 200° C. using a 1,3,5-trichlorobenzene-d3/o-dichlorobenzene-d4 (mixing ratio: 2/1) mixed solvent as a solvent, and calculating the intensity ratio of the signal at 43.35 ppm (that is attributed to meso diads) to the signal at 43.43 ppm (that is attributed to racemo diads).

(5) Amount of Polar Group Introduced into Hydrogenated Crystalline Polar Group-Containing Dicyclopentadiene Ring-Opening Polymer The presence or absence of a polar group in the hydrogenated crystalline polar group-containing dicyclopentadiene ring-opening polymer was determined by a transmission method using an FT-IR measurement device ("AVATAR 360" manufactured by Thermo Fisher Scientific). For example, when vinyltrimethoxysilane has been introduced into the hydrogenated crystalline polar group-containing dicyclopentadiene ring-opening polymer, an absorption band attributed to an Si—OCH$_3$ group is observed at 825 cm$^{-1}$ and 739 cm$^{-1}$ in the FT-IR spectrum. When maleic anhydride has been introduced into the hydrogenated crystalline polar group-containing dicyclopentadiene ring-opening polymer, an absorption band attributed to a carbonyl group (C=O group) is observed at 1,790 cm$^{-1}$ in the FT-IR spectrum.

The amount of polar group introduced into the hydrogenated crystalline polar group-containing dicyclopentadiene ring-opening polymer was quantitatively determined by FT-IR. Specifically, the amount of polar group introduced into the hydrogenated crystalline polar group-containing dicyclopentadiene ring-opening polymer was determined by calculating the ratio of the peak height of the absorption band attributed to each polar group to the peak height (920 cm$^{-1}$) attributed to 1,2-C=C of the hydrogenated crystalline dicyclopentadiene ring-opening polymer, and calculating the amount of polar group introduced into the hydrogenated crystalline polar group-containing dicyclopentadiene ring-opening polymer using a calibration curve provided in advance. The integration count was set to 16.

(6) Initial Peel Strength of Resin Film and Metal Layer

The initial peel strength of the resin film and the metal layer was measured by a peel test using a tensile tester ("AGS-10kNX" manufactured by Shimadzu Corporation). Specifically, the laminate film was immobilized, and part of the metal layer and the resin layer was physically peeled off, and pulled at a speed of 100 mm/s and an angle of 90° to measure the peel strength.

(7) Peel Strength of Resin Film and Metal Layer after being Heated at 150° C. for 200 Hours The laminate film was heated at 150° C. for 200 hours using an oven, and the peel strength was measured in the same manner as described above (see "(6) Initial peel strength of resin film and metal layer").

Production Example 1

Production of Hydrogenated Crystalline Dicyclopentadiene Ring-Opening Polymer

A pressure-resistant reaction vessel made of glass which had been sufficiently dried and in which the internal atmosphere had been replaced by nitrogen, was charged with 40 parts of a 75% cyclohexane solution of dicyclopentadiene (endo-isomer content: 99% or more) (amount of dicyclopentadiene: 30 parts). After the addition of 738 parts of cyclohexane and 2.0 parts of 1-hexene, the mixture was heated to 50° C. Separately, 4.6 parts of an n-hexane solution of diethylaluminum ethoxide (19 wt %) was added to a solution prepared by dissolving 1.1 parts of a tetrachlorotungsten phenylimide-(tetrahydrofuran) complex in 56 parts of toluene, and the mixture was stirred for 10 minutes to prepare a catalyst solution. The catalyst solution was added to the reaction vessel to initiate a ring-opening polymerization reaction. After the addition of 40 parts of a 75% cyclohexane solution of dicyclopentadiene nine times (every 5 minutes) while maintaining the temperature of the mixture at 50° C., the mixture was reacted for 2 hours.

After completion of the reaction, a small quantity of isopropanol was added to the reaction mixture to terminate the polymerization reaction. The polymer solution was poured into a large quantity of isopropanol to coagulate the ring-opening polymer. The ring-opening polymer thus coagulated was filtered off. The ring-opening polymer was then dried at 40° C. for 20 hours under reduced pressure.

The yield of the polymer was 296 parts (i.e., 99%). The number average molecular weight (Mn) and the weight average molecular weight (Mw) of the polymer were respectively 14,200 and 27,000, and the molecular weight distribution (Mw/Mn) calculated from the number average molecular weight (Mn) and the weight average molecular weight (Mw) was 1.90.

A pressure-resistant reaction vessel was charged with 60 parts of the ring-opening polymer and 261 parts of cyclohexane, and the mixture was stirred to dissolve the ring-opening polymer in cyclohexane. After the addition of a hydrogenation catalyst solution prepared by dissolving 0.039 parts of chlorohydridocarbonyltris(triphenylphosphine)ruthenium in 40 parts of toluene, a hydrogenation reaction was effected at 160° C. for 5 hours under a hydrogen pressure of 4 MPa. The resulting reaction mixture was poured into a large quantity of isopropyl alcohol to completely precipitate the polymer. The precipitate was filtered off, washed, and dried at 60° C. for 24 hours under reduced pressure to obtain a hydrogenated crystalline dicyclopentadiene ring-opening polymer.

The hydrogenation rate of the hydrogenated crystalline dicyclopentadiene ring-opening polymer was 99% or more, and the ratio of racemo diads in the hydrogenated crystalline dicyclopentadiene ring-opening polymer was 85%. The melting point of the hydrogenated crystalline dicyclopentadiene ring-opening polymer was 265° C.

Production Example 2

Production of Hydrogenated Crystalline Polar Group-Containing Dicyclopentadiene Ring-Opening Polymer A 2.0 parts of vinyltrimethoxysilane ("KBM-1003" manufactured by Shin-Etsu Chemical Co., Ltd. ("VTMS" in Table 1)) and 0.2 parts of 2,5-dimethyl-2,5-di(t-butylperoxy) hexane ("PERHEXA (registered trademark) 25B" manufactured by NOF Corporation) were added to 100 parts of pellets of the hydrogenated crystalline dicyclopentadiene ring-opening polymer obtained as described above. The mixture was kneaded (mixed) using a twin-screw extruder ("TEM35B" manufactured by Toshiba Machine Co., Ltd.) (resin temperature: 270° C., screw rotational speed: 100 rpm, residence time: 60 to 70 seconds), and extruded in the shape of a strand. The extruded product was cooled with water, and cut using a pelletizer to obtain 97 parts of pellets of a hydrogenated crystalline polar group-containing dicyclopentadiene ring-opening polymer A into which vinyltrimethoxysilane was introduced.

An absorption band attributed to an Si—OCH$_3$ group and an absorption band attributed to an Si—CH$_2$ group were observed in the FT-IR spectrum of the hydrogenated crystalline polar group-containing dicyclopentadiene ring-opening polymer A into which vinyltrimethoxysilane was introduced. The amount of vinyltrimethoxysilane introduced into the hydrogenated crystalline polar group-containing dicyclopentadiene ring-opening polymer was 1.5 parts based on 100 parts of the hydrogenated crystalline polar group-containing dicyclopentadiene ring-opening polymer.

Production Example 3

Production of Hydrogenated Crystalline Polar Group-Containing Dicyclopentadiene Ring-Opening Polymer B 97 parts of pellets of a hydrogenated crystalline polar group-containing dicyclopentadiene ring-opening polymer B into which an alkoxysilyl group was introduced were obtained in the same manner as in Production Example 2, except that 2.0 parts of 3-acryloxypropyltrimethoxysilane ("KBM-5103" manufactured by Shin-Etsu Chemical Co., Ltd. ("APTMS" in Table 1)) was used instead of vinyltrimethoxysilane.

An absorption band attributed to an Si—OCH$_3$ group and an absorption band attributed to an Si—CH$_2$ group were observed in the FT-IR spectrum of the hydrogenated crystalline polar group-containing dicyclopentadiene ring-opening polymer B into which an alkoxysilyl group was introduced. The amount of vinyltrimethoxysilane introduced into the hydrogenated crystalline polar group-containing dicyclopentadiene ring-opening polymer was 1.7 parts based on 100 parts of the hydrogenated crystalline polar group-containing dicyclopentadiene ring-opening polymer.

Production Example 4

Production of Hydrogenated Crystalline Polar Group-Containing Dicyclopentadiene Ring-Opening Polymer C 97 parts of pellets of a hydrogenated crystalline polar group-containing dicyclopentadiene ring-opening polymer C into which an alkoxysilyl group was introduced were obtained in the same manner as in Production Example 2, except that 2.0 parts of 3-methacryloxypropyltrimethoxysilane ("KBM-503" manufactured by Shin-Etsu Chemical Co., Ltd. ("MPTMS" in Table 1)) was used instead of vinyltrimethoxysilane.

An absorption band attributed to an Si—OCH$_3$ group and an absorption band attributed to an Si—CH$_2$ group were observed in the FT-IR spectrum of the hydrogenated crystalline polar group-containing dicyclopentadiene ring-opening polymer C into which an alkoxysilyl group was introduced. The amount of vinyltrimethoxysilane introduced into the hydrogenated crystalline polar group-containing dicyclopentadiene ring-opening polymer was 1.5 parts based on 100 parts of the hydrogenated crystalline polar group-containing dicyclopentadiene ring-opening polymer.

Production Example 5

Production of Hydrogenated Crystalline Polar Group-Containing Dicyclopentadiene Ring-Opening Polymer D 2.0 parts of maleic anhydride ("CRYSTAL MAN (registered trademark)" manufactured by NOF Corporation ("MAH" in Table 1)) and 0.2 parts of 2,5-dimethyl-2,5-di (t-butylperoxy)hexane ("PERHEXA (registered trademark) 25B" manufactured by NOF Corporation) were added to 100 parts of pellets of the hydrogenated crystalline dicyclopentadiene ring-opening polymer obtained as described above. The mixture was kneaded (mixed) using a twin-screw extruder ("TEM35B" manufactured by Toshiba Machine Co., Ltd.) (resin temperature: 270° C., screw rotational speed: 100 rpm, residence time: 60 to 70 seconds), and extruded in the shape of a strand. The extruded product was cooled with water, and cut using a pelletizer to obtain 97 parts of pellets of a hydrogenated crystalline polar group-containing dicyclopentadiene ring-opening polymer D into which maleic anhydride was introduced.

An absorption band attributed to a C=O group was observed in the FT-IR spectrum of the hydrogenated crystalline polar group-containing dicyclopentadiene ring-opening polymer D into which maleic anhydride was introduced. The amount of maleic anhydride introduced into the hydrogenated crystalline polar group-containing dicyclopentadiene ring-opening polymer was 1.1 parts.

Example 1

100 parts of the hydrogenated crystalline polar group-containing dicyclopentadiene ring-opening polymer B and 0.5 parts of an antioxidant (tetrakis[methylene-3-(3',5'-di-tert-butyl-4'-hydroxyphenyl)propionate]methane ("IRGANOX (registered trademark) 1010" manufactured by BASF Japan Ltd.)) were mixed, and the mixture was kneaded (mixed) using a twin-screw extruder ("TEM35B" manufactured by Toshiba Machine Co., Ltd.) (resin temperature: 270° C., residence time: 30 seconds), and extruded in the shape of a strand. The extruded product was cooled with water, and cut using a pelletizer to obtain pellets. The pellets were melt-extruded using a melt extrusion film-forming machine provided with a T-die ("Measuring Extruder Type Me-20/2800 V3" manufactured by Optical Control Systems) (barrel temperature: 280° C., T-die temperature: 290° C., cooling roll temperature: 90° C., take-up speed: 2 m/min), and a film having a thickness of 30 µm and a width of 120 mm was wound around a roll at a speed of 2 m/min to obtain a film-shaped formed article.

The resin film roll wound around the roll was cut to obtain a film having a size of 100 mm×100 mm, and an electrode-posited copper foil ("F3-WS-12" manufactured by Furukawa Co., Ltd., 100 mm×100 mm×12 µm (thickness), surface roughness (10-point average roughness Rz): 2.4 µm) was stacked on the film. The resulting laminate (laminate film) was subjected to thermocompression bonding (compression-bonding pressure: 0.1 MPa) at a temperature of 150° C. for 60 seconds under a reduced pressure of 200 Pa using a vacuum laminator provided with a heat-resistant rubber press plate at the top and the bottom (primary pressing). The laminate film was then subjected to thermocompression bonding (compression-bonding pressure: 1.0 MPa) at a temperature of 150° C. for 90 seconds using a vacuum laminator provided with a metal press plate at the top and the bottom (secondary pressing) to obtain a laminate film. The initial peel strength and the peel strength after heating were measured using the resulting laminate film. The measurement results are shown in Table 1.

Example 2

A film-shaped formed article was obtained in the same manner as in Example 1, except that 30 parts of the hydrogenated crystalline non-polar dicyclopentadiene ring-opening polymer and 70 parts of the hydrogenated crystalline polar group-containing dicyclopentadiene ring-opening polymer B were used instead of 100 parts of the hydrogenated crystalline polar group-containing dicyclopentadiene ring-opening polymer B.

A laminate film was produced in the same manner as in Example 1, except that the resulting resin film was used, and the peel strength of the laminate film was measured. The measurement results are shown in Table 1.

Example 3

A film-shaped formed article was obtained in the same manner as in Example 1, except that 70 parts of the hydrogenated crystalline non-polar dicyclopentadiene ring-opening polymer and 30 parts of the hydrogenated crystalline polar group-containing dicyclopentadiene ring-opening polymer B were used instead of 100 parts of the hydrogenated crystalline polar group-containing dicyclopentadiene ring-opening polymer B.

A laminate film was produced in the same manner as in Example 1, except that the resulting resin film was used, and the peel strength of the laminate film was measured. The measurement results are shown in Table 1.

Example 4

Copper was stacked on the resin film obtained in Example 3 using the method and the conditions disclosed in JP-A-2008-94923. Specifically, a copper thin film having a thickness of 0.5 μm was formed by electroless plating using a glyoxylic acid bath and a hypophosphorous acid bath. An electrodeposited copper film having a thickness of 20 μm was formed on the copper thin film using a sulfuric acid copper plating solution (solution temperature: 25° C., current density: 3.33 A/dm$^2$) to obtain a laminate film.

The peel strength of the resulting laminate film was measured in the same manner as described above. The measurement results are shown in Table 1.

Example 5

A film-shaped formed article was obtained in the same manner as in Example 1, except that 70 parts of the hydrogenated crystalline non-polar dicyclopentadiene ring-opening polymer and 30 parts of the hydrogenated crystalline polar group-containing dicyclopentadiene ring-opening polymer A were used instead of 100 parts of the hydrogenated crystalline polar group-containing dicyclopentadiene ring-opening polymer B.

A laminate film was produced in the same manner as in Example 1, except that the resulting resin film was used, and the peel strength of the laminate film was measured. The measurement results are shown in Table 1.

Example 6

A film-shaped formed article was obtained in the same manner as in Example 2, except that 70 parts of the hydrogenated crystalline non-polar dicyclopentadiene ring-opening polymer and 30 parts of the hydrogenated crystalline polar group-containing dicyclopentadiene ring-opening polymer C were used instead of 100 parts of the hydrogenated crystalline polar group-containing dicyclopentadiene ring-opening polymer B.

A laminate film was produced in the same manner as in Example 1, except that the resulting resin film was used, and the peel strength of the laminate film was measured. The measurement results are shown in Table 1.

Example 7

A film-shaped formed article was obtained in the same manner as in Example 2, except that 70 parts of the hydrogenated crystalline non-polar dicyclopentadiene ring-opening polymer and 30 parts of the hydrogenated crystalline polar group-containing dicyclopentadiene ring-opening polymer D were used instead of 100 parts of the hydrogenated crystalline polar group-containing dicyclopentadiene ring-opening polymer B.

A laminate film was produced in the same manner as in Example 1, except that the resulting resin film was used, and the peel strength of the laminate film was measured. The measurement results are shown in Table 1.

Example 8

A film-shaped formed article was obtained in the same manner as in Example 2, except that 95 parts of the hydrogenated crystalline non-polar dicyclopentadiene ring-opening polymer and 5 parts of the hydrogenated crystalline polar group-containing dicyclopentadiene ring-opening polymer B were used instead of 100 parts of the hydrogenated crystalline polar group-containing dicyclopentadiene ring-opening polymer B.

A laminate film was produced in the same manner as in Example 1, except that the resulting resin film was used, and the peel strength of the laminate film was measured. The measurement results are shown in Table 1.

Comparative Example 1

A film-shaped formed article was obtained in the same manner as in Example 1, except that 100 parts of the hydrogenated crystalline non-polar dicyclopentadiene ring-opening polymer was used instead of 100 parts of the hydrogenated crystalline polar group-containing dicyclopentadiene ring-opening polymer B.

A laminate film was produced in the same manner as in Example 1, except that the resulting resin film was used, and the peel strength of the laminate film was measured. The measurement results are shown in Table 1.

TABLE 1

| | | Hydrogenated crystalline polar group-containing dicyclopentadiene ring-opening polymer | | | | | |
|---|---|---|---|---|---|---|---|
| | | Content | Polar group introduced | | | | Amount of polar group introduced |
| | | (parts by weight) | APTMS | VTMS | MPTMS | MAH | (parts by weight) |
| Example | 1 | 100 | Introduced | | | | 1.79 |
| | 2 | 70 | Introduced | | | | 1.25 |
| | 3 | 30 | Introduced | | | | 0.54 |
| | 4 | 30 | Introduced | | | | 0.54 |
| | 5 | 30 | | Introduced | | | 0.45 |
| | 6 | 30 | | | Introduced | | 0.45 |
| | 7 | 30 | | | | Introduced | 0.36 |
| | 8 | 5 | Introduced | | | | 0.09 |
| Comparative Example | 1 | — | | | | | 0 |

TABLE 1-continued

| | | Hydrogenated crystalline non-polar dicyclopentadiene ring-opening polymer | | Peel strength (N/15 mm) | |
|---|---|---|---|---|---|
| | | Content (parts by weight) | Copper foil stacking method | Initial value | After heating at 150° C. for 200 hours |
| Example | 1 | 0 | Pressing | 26.5 | 26.8 |
| | 2 | 30 | Pressing | 22.3 | 21.7 |
| | 3 | 70 | Pressing | 15.2 | 15.7 |
| | 4 | 70 | Plating | 15.8 | 15.3 |
| | 5 | 70 | Pressing | 14.9 | 14.7 |
| | 6 | 70 | Pressing | 15.0 | 14.8 |
| | 7 | 70 | Pressing | 15.2 | 15.4 |
| | 8 | 95 | Pressing | 6.31 | 6.25 |
| Comparative Example | 1 | 100 | Pressing | 0.028 | 0.035 |

As is clear from the results shown in Table 1, the laminate films obtained in Examples 1 to 8 exhibited high initial peel strength, and did not show a significant change in peel strength even when allowed to stand at 150° C. for 200 hours (i.e., the resin film exhibited excellent adhesion to the metal thin film).

The invention claimed is:

1. A resin material comprising a hydrogenated crystalline polar group-containing dicyclopentadiene ring-opening polymer and a hydrogenated crystalline non-polar dicyclopentadiene ring-opening polymer in a weight ratio (hydrogenated crystalline polar group-containing dicyclopentadiene ring-opening polymer:hydrogenated crystalline non-polar dicyclopentadiene ring-opening polymer) of 100:0 to 1:99, the hydrogenated crystalline polar group-containing dicyclopentadiene ring-opening polymer being obtained by melt-mixing a hydrogenated crystalline non-polar dicyclopentadiene ring-opening polymer, a radical initiator, and a polar group-containing compound that includes an ethylenically unsaturated bond,
the resin material comprising a structural unit derived from the polar group-containing compound that includes an ethylenically unsaturated bond in a ratio of 0.05 to 3.0 parts by weight based on 100 parts by weight of the hydrogenated crystalline polar group-containing dicyclopentadiene ring-opening polymer and the hydrogenated crystalline non-polar dicyclopentadiene ring-opening polymer in total.

2. The resin material according to claim 1, wherein the polar group included in the polar group-containing compound that includes an ethylenically unsaturated bond is an alkoxysilyl group or a carboxylic acid residue.

3. A resin film comprising the resin material according to claim 2.

4. A resin film comprising the resin material according to claim 1.

5. A laminate film comprising the resin film according to claim 4, and a metal film that is stacked on the resin film and has a thickness of from 0.01 to 500 μm.

6. The resin material according to claim 1, wherein the polar group included in the polar group-containing compound that includes an ethylenically unsaturated bond is a carboxylic anhydride group.

7. The resin material according to claim 1, wherein the polar group included in the polar group-containing compound that includes an ethylenically unsaturated bond is an alkoxysilyl group.

* * * * *